(12) United States Patent
Lottes et al.

(10) Patent No.: US 12,097,761 B2
(45) Date of Patent: Sep. 24, 2024

(54) DISPLAY DEVICE FOR A VEHICLE AND A METHOD FOR OPERATING THE DISPLAY DEVICE

(71) Applicant: AUDI AG, Ingolstadt (DE)

(72) Inventors: Daniel Lottes, Ihrlerstein (DE); Christian Wall, Hitzhofen (DE); Romain Diboine, Seoul (KR); Doh Yeon Kim, Seoul (KR); Seonghwan Kim, Seoul (KR)

(73) Assignee: AUDI AG, Ingolstadt (DE)

( * ) Notice: Subject to any disclaimer, the term of this patent is extended or adjusted under 35 U.S.C. 154(b) by 280 days.

(21) Appl. No.: 17/416,035

(22) PCT Filed: Dec. 16, 2019

(86) PCT No.: PCT/EP2019/085348
§ 371 (c)(1),
(2) Date: Jun. 18, 2021

(87) PCT Pub. No.: WO2020/127047
PCT Pub. Date: Jun. 25, 2020

(65) Prior Publication Data
US 2022/0066723 A1    Mar. 3, 2022

(30) Foreign Application Priority Data
Dec. 19, 2018    (EP) ..................................... 18213974

(51) Int. Cl.
*G06F 3/147*    (2006.01)
*B60K 35/00*    (2006.01)
(Continued)

(52) U.S. Cl.
CPC ................ *B60K 35/00* (2013.01); *B60Q 1/50* (2013.01); *B60Q 1/5037* (2022.05); *B60Q 1/543* (2022.05);
(Continued)

(58) Field of Classification Search
CPC .............................. G06F 3/147; B60K 35/00
See application file for complete search history.

(56) References Cited

U.S. PATENT DOCUMENTS 10,279,683 B2 *    5/2019    Torii ..................... G08G 1/0962
2002/0175830 A1    11/2002    Hudson
(Continued)

FOREIGN PATENT DOCUMENTS

CN    102216107 A    10/2011
CN    103909864 A    7/2014
(Continued)

OTHER PUBLICATIONS

International Search Report (Forms PCT/ISA/210, PCT/ISA/220); mailed Mar. 11, 2020 in corresponding PCT Application No. PCT/EP2019/085348 (4 pages).
(Continued)

*Primary Examiner* — Matthew Salvucci
(74) *Attorney, Agent, or Firm* — STAAS & HALSEY LLP

(57) ABSTRACT

A display device for a vehicle includes a display panel, a control circuitry, and a supporting arrangement. The display panel displays a graphic display object and the control circuitry enables the displaying of the graphic display object, such that the information represented by the graphic display object is displayed based on a predefined physical environment condition. The supporting arrangement supports the display panel which is adjustable between a first position and a second position. In the first position, the graphic display object is visually accessible to a user inside the vehicle and in the second position, the graphic display object is visually accessible to at least one person outside the vehicle.

19 Claims, 3 Drawing Sheets

(51) Int. Cl.
    *B60Q 1/50*     (2006.01)
    *B60R 11/02*     (2006.01)
    *B60R 25/24*     (2013.01)
    *G06Q 10/02*     (2012.01)
    *G06Q 30/0251*     (2023.01)
    *G06Q 30/0283*     (2023.01)
    *B60K 35/22*     (2024.01)
    *B60K 35/28*     (2024.01)
    *B60K 35/53*     (2024.01)
    *B60K 35/65*     (2024.01)
    *B60K 35/80*     (2024.01)
    *B60R 11/00*     (2006.01)
    *G06V 40/16*     (2022.01)

(52) U.S. Cl.
    CPC ........ *B60R 11/0235* (2013.01); *B60R 25/241* (2013.01); *G06F 3/147* (2013.01); *G06Q 10/02* (2013.01); *G06Q 30/0266* (2013.01); *G06Q 30/0284* (2013.01); *B60K 35/22* (2024.01); *B60K 35/28* (2024.01); *B60K 35/53* (2024.01); *B60K 35/65* (2024.01); *B60K 35/80* (2024.01); *B60K 2360/164* (2024.01); *B60K 2360/166* (2024.01); *B60K 2360/56* (2024.01); *B60K 2360/741* (2024.01); *B60R 2011/0005* (2013.01); *B60R 2011/0085* (2013.01); *G06Q 2240/00* (2013.01); *G06V 40/172* (2022.01)

(56) References Cited

U.S. PATENT DOCUMENTS

| | | | |
|---|---|---|---|
| 2009/0128307 A1 | 5/2009 | Hentsch et al. | |
| 2010/0051766 A1* | 3/2010 | Bonito | B60R 11/0229 296/1.07 |
| 2015/0180999 A1 | 6/2015 | Pisz | |
| 2018/0194227 A1* | 7/2018 | Gussen | H04N 21/42222 |
| 2018/0264945 A1 | 9/2018 | Torii | |
| 2020/0104881 A1* | 4/2020 | Yasui | G06Q 30/0266 |

FOREIGN PATENT DOCUMENTS

| | | |
|---|---|---|
| CN | 108621942 A | 10/2018 |
| CN | 108725350 A | 11/2018 |
| DE | 10238531 A1 | 3/2004 |
| DE | 102 44 100 A1 | 4/2004 |
| DE | 102015200233 A1 | 7/2016 |
| EP | 3231690 A1 | 10/2017 |
| EP | 18213974.1 | 12/2018 |
| WO | PCT/EP2019/085348 | 12/2019 |

OTHER PUBLICATIONS

Written Opinion (Form PCT/ISA/237); mailed Mar. 11, 2020 in corresponding PCT Application No. PCT/EP2019/085348 (5 pages).
Extended European Search Report dated Jun. 6, 2019 in corresponding European Patent Application No. 18213974.1 (7 pages).
International Preliminary Report on Patentability (Form PCT/IB/373); dated Jun. 16, 2021 in corresponding PCT Application No. PCT/EP2019/085348 (1 page).
Chinese Office Action issued in Chinese Application No. 201980083574.0 dated Oct. 12, 2023.
Chinese Office Action issued in counterpart Chinese Application 201980083574.0 dated Mar. 4, 2024.
Third Chinese Office Action issued in counterpart Chinese Application No. 201980083574.0 dated Jul. 18, 2024.

* cited by examiner

DISPLAY DEVICE FOR A VEHICLE AND A METHOD FOR OPERATING THE DISPLAY DEVICE

CROSS-REFERENCE TO RELATED APPLICATIONS

This application is a U.S. national stage of International Application No. PCT/EP2019/085348, filed on Dec. 16, 2019. The International Application claims the priority benefit of European Patent Application No. 18213974.1 filed on Dec. 19, 2018. Both International Application No. PCT/EP2019/085348 and European Patent Application No. 18213974.1 are incorporated by reference herein in their entirety.

BACKGROUND

Described herein is a display device for a vehicle and a method for operating the display device.

Nowadays a display device has become an integral part of a vehicle. The display device usually includes a display panel (with or without touch-screen functionality) which usually functions as a user interface. The display panels are usually designed to display graphical display objects for providing information to a user, such that the information can be virtually accessible to the user. However, the user of the vehicle may want or need to communicate information with people outside the vehicle. These communications may be in the form of a printed or written notice. For example, the user may leave a parking ticket on a dashboard of the vehicle just behind the windscreen, so that a parking ticket inspector can view the parking ticket through the windscreen. Furthermore, other situations may arise when the user may need to leave a note for another person or people outside the vehicle. However, such way of communicating with people outside the vehicle by using a written note or putting a parking ticket on the dashboard is not ideal, since the user or the driver of the vehicle always need to be remembered to write a note or leave a park ticket before leaving the vehicle. Furthermore, it may be needed that a particular message should be shown to a particular person and should not be displayed for the other people which in the case of using a written note or a parking ticket is not possible.

German Patent Application No. 10 2015 200 233 A1 describes a device and a method for informing the driver of a vehicle, in particular a passenger motor vehicle, outside the vehicle, during an automatic parking operation with a display that is configured to be retractable between a retracted non used position and an extended display setting form into the dashboard. This is enabled by use of a driving mechanism for extending and retracting the latter, and the driving mechanism additionally is equipped for a special taking of a specific information position for informing the driver outside the vehicle.

U.S. Patent Application Publication No. US 2009/0128307 A1 describes a display device for a vehicle including a display for representing application data to a vehicle user and piloting means for moving the display between at least two positions. The display device is characterized in that it further includes checking means for checking whether or not the representation of data of an application selected by the vehicle user is permitted in the actual state of the vehicle, and release means in order to release the piloting means for controlling the display according to the application or any application selected by the vehicle user, in case the checking means emits an informative signal.

German Patent Application No. 102 38 531 A1 describes a display device with a display panel with variable optical elements for an E-mail generation and for an arrangement inside the vehicle so that the vehicle's part or operating elements in the vehicle can be seen through the display panel. The display panel is pilotable out of the direction of view from the driver to the vehicle's part or operating elements.

SUMMARY

Aspects of the disclosure described herein are directed to a display device for a vehicle which provides a display of information to a user inside the vehicle as well as to people outside the vehicle, for example when the user is not present inside the vehicle and/or the vehicle is parked.

This may be accomplished by the display device and vehicle described herein. Advantageous developments with convenient and non-trivial further embodiments are also described herein.

Aspects of the disclosure are based on a realization to solve a problem of communicating with a predefined user or a plurality of persons outside a vehicle without resorting to writing a note on a piece of paper and/or sticking it to the vehicle or putting it on the dashboard or leaving it behind the windshield. As described herein, the display device for a vehicle includes a display panel which is designed to display at least one graphic display object. Furthermore, the display device includes a control circuitry which is designed to enable the displaying of the at least one graphic display object. In other words, the display panel may include a pixel matrix. The control circuitry may be adapted to actuate respective pixel elements of the pixel matrix in order to enable the displaying of the at least one graphic display object. Furthermore, the display device includes a supporting arrangement which is designed to support the display panel, wherein the display panel is adjustable between a first position and a second position. In the first position, the at least one graphic display object on the display panel is visually accessible to a user inside the vehicle. In other words, the user inside the vehicle, who can be the driver of the vehicle, can access the graphic display object displayed by the display panel. The graphic display object may include information such as a navigation route and/or functionalities of an infotainment system and/or a weather report. Furthermore, in the second position, the at least one graphic display object on the display panel is visually accessible to at least one of a plurality of persons outside the vehicle. On one side, the supporting arrangement may support the display panel which is in the first position in such a manner that the display panel is visually accessible to the user inside the vehicle and on the other side, the supporting arrangement can be used to adjust a position of the display panel in the second position, such that the display panel can be viewable from outside the vehicle. For example, the display device may be located or integrated by use of the supporting arrangement on a dashboard of the vehicle in front of a windshield, such that in the first position, the display panel is visually accessible to the user inside the vehicle, whereas the display panel may be turned to a second position by use of the supporting arrangement, such that the display panel can be visible from outside the vehicle through the windscreen. Hence, the display device can enable a communication between the user of the vehicle with the plurality of persons outside the vehicle.

The display panel can be adjusted from the first position to the second position by the user manually, for example by turning the display panel about the supporting arrangement. Furthermore, the display panel can be adjusted from the first position to the second position by use of the control circuitry, wherein the control circuitry can receive a first control signal from an electronic control unit of the vehicle. The electronic control unit can send the first control signal to the control circuitry, for example when the vehicle is parked. Upon receiving the first control signal, the control circuitry can actuate an actuator of the supporting arrangement, which in turn can enable the display panel to adjust from the first position to the second position. Furthermore, the first control signal can enable the outputting of the at least one graphic display object in such a manner, that information represented by the graphic display object can be perceivable by the user or the plurality of persons outside the vehicle.

As described herein, the control circuitry is adapted to enable the displaying of the at least one graphic display object, such that information represented by the at least one graphic display object is displayed in accordance with a predefined physical environment condition. The control circuitry can receive a second control signal from the electronic control unit of the vehicle, wherein the second control signal can include information regarding the predefined physical environment. This is of advantage, because this enables a selected form of information represented by the at least one graphic display object in accordance with the predefined physical environment condition. The predefined physical environment condition can be, for example, a presence of a selected person outside the vehicle, a weather condition outside the vehicle, a traffic condition, or a location of the vehicle. Hence, an efficient displaying of the information represented by the at least one graphic display object can be realized.

Furthermore, the display panel can be adjusted from the second position to the first position by use of the control circuitry, wherein the control circuitry can receive a third control signal from the electronic control unit. The electronic control unit can send the third control signal to the control circuitry, for example, when the vehicle is started or a door of the vehicle is unlocked. Upon receiving the third control signal, the control circuitry can actuate the actuator of the supporting arrangement, which in turn can enable the display panel to be adjusted from the second position to the first position. Furthermore, the third control signal can enable the outputting of the at least one graphic display object in such a manner that an information represented by the graphic display object is perceivable by the user inside the vehicle. Hence, an efficient and automatic adjustment of the display panel from the first position to the second position and vice versa can be realized.

Also described herein are embodiments that provide features which afford additional technical advantages.

In an embodiment, with the display panel in the second position, the predefined physical environment condition can be based on an identification of a presence of the user in a predefined threshold distance from the display device outside the vehicle, as signaled by a proximity sensor. The proximity sensor can be a capacitive sensor or a photoelectric sensor or an inductive proximity sensor or an ultrasonic sensor or a radar sensor. Such proximity sensors can be installed on an outer surface of the vehicle, such that when the user or the plurality of persons lie or approach within the predefined distance from the display device outside the vehicle, then the presence of the user or the plurality of persons can be identified and a proximity signal can be sent from the corresponding proximity sensor to the control circuitry. The control circuitry can in turn enable the displaying of the at least one graphic display object on the display panel, wherein the display panel can be in the second position. This is of advantage, because this can enable an activation of the display panel only at the presence of the user or the plurality of persons near the display device. Hence, it can be ensured that the information represented by the at least one graphic display object is visually accessible to the user or the plurality of persons, only when the user or the plurality of persons is close to the vehicle or is within the predefined threshold distance. This can ensure a conservation of energy, since the display panel is switched on or activated only in the presence of the user or the plurality of persons near the display device, rather than that the display panel is switched on in a continuous manner even in the absence of any person in front of the display device or far away from the display device, in which case the information displayed by the display panel cannot be accessible by any person outside the vehicle.

In an embodiment, with the display panel in the second position, the information represented by the at least one graphic display object can be a predefined text message including a personal message referring to a predefined user, as signaled by a face recognition sensor and/or a receiver for receiving an identification signal from a mobile device. In other words, a face recognition sensor or other machine vision processing sensor may be used to identify a person or a predefined user in the proximity of the vehicle. Furthermore, the data of the predefined user may be pre-stored in the control circuitry of the vehicle. Furthermore, the predefined user can be recognized by the receiver, which can be a part of the electronic control unit, such that when the predefined user is proximate to the vehicle, the identification signal is sent from his mobile device, such as his smart phone, by use of, for example, Bluetooth, and hence, the predefined user can be identified. Upon an identification of the predefined user, the predefined text message including a personal message can be displayed on the display panel of the display device in the second position. For example, such a personal message can be a welcome message for the predefined user, whose name is, for example Arthur. When the predefined user approaches the vehicle, then the display panel can display a text message, for example "Welcome Arthur". A further advantage can be that certain personal messages which can be only meant to be displayed to a particular predefined user, can be displayed only to that particular predefined user and not to any other person. This can enable security as well as privacy.

In an embodiment, the control circuitry may be adapted to disable the displaying of the personal message by the display panel after an expiration of a predefined time interval and/or upon receiving a communication signal from the predefined user, that the personal message is no longer needed to be displayed and/or upon an identification that the predefined user is no longer proximate to the display device. This is of advantage, because this enables the display of the information represented by the at least one graphic display object to the predefined user, such that the personal message is not displayed to any other person other than the predefined user. Hence, a privacy of the communication of the personal message can be established. It is further thinkable, that the control circuitry may be adapted to disable the displaying of the graphic display object on the display panel after the expiration of the predefined time interval.

In an embodiment, with the display panel in the second position, information represented by the at least one graphic display object can be a predefined parking time, for which the control circuitry has triggered a digital payment. In other words, when a parking place at a parking location is found, the vehicle can be driven to the parking place and be parked. Upon the parking of the vehicle, the control circuitry can identify the parking of the vehicle by use of a GPS unit which can provide the location of the parking place or by an identification of a stoppage of an engine of the vehicle for a predefined time interval which can indicate the parking of the vehicle. Upon parking of the vehicle, the control circuitry can then send a login signal to a parking server unit, in order to notify the parking server unit that the vehicle has been parked and then at the same time trigger the digital payment to the parking server unit, in order to obtain a digital parking ticket. Furthermore, upon the parking of the vehicle, the control circuitry can trigger an adjustment of the display panel to the second position, such that the display panel can be visibly accessible to a user or to a person outside the vehicle. In this situation, the information represented by the at least one graphic display object can be in the form of a predefined parking time. The predefined parking time may include the time of parking of the vehicle as well as the amount of time remaining from the allowed amount of time to be parked as per the digital parking ticket.

In an embodiment, with the display panel in the second position, the information represented by the at least one graphic display object can be an informational message and/or an advertisement on the basis of the predefined physical environment condition. Furthermore, the physical environment condition can be based on an identification of a current location of the vehicle and/or a physical environment of the vehicle and/or a weather report, as signaled by a backend server unit. In other words, on the basis of the current physical environment of the vehicle or the current surroundings of the vehicle at a point of time, the information displayed by the display panel can be chosen, such that the informational message or the advertisement displayed by the display panel can correspond to the surroundings or the environmental condition of the vehicle at that particular time. For example, if the vehicle is parked at a parking place near a school, then the control circuitry can identify the location by the use of the GPS unit. At this point of time, the backend server unit can signal the control circuitry about the current weather, for example the weather is sunny and warm. In that case, the control circuitry can enable the display panel to display an advertisement of an ice cream. Since, the advertisement of the ice cream at that current situation of the weather and the location of the parked vehicle near the school can provide a suitable platform or marketing for a company or firm corresponding to the ice cream advertisement to achieve marketing and thereby gain financial benefits.

In an embodiment, with the display device in the second position, information of the at least one graphic display object can include an identification code which indicates a booking of the vehicle in a booking system. For example, the vehicle can be used as a car sharing vehicle, such that the vehicle can be used by multiple users. The user upon parking his vehicle can decide to use his vehicle or rent his vehicle as a car sharing vehicle. In that case, the user can be connected to a backend server unit of a car sharing company by use of his display device. The user can log in to his user profile of a car sharing company through the display device in the first position. In that case, a registration signal can be sent from the control circuitry to the backend server unit of the car sharing company indicating that the vehicle is available as a car sharing vehicle. Upon receiving the registration signal, the backend server unit can send an identification signal to the control unit. After receiving the identification signal, information of the at least one graphic display object can include an identification code, which indicates the booking of the vehicle in a booking system, for example of the car sharing company. This is of advantage, because this enables the identification of the vehicle as a car sharing vehicle by the identification number which can be changed for every booking, which in turn can be beneficial for security and privacy purposes.

In an embodiment, an identification signal is received by the control circuitry based on a booking code corresponding to the identification code, upon which the control circuitry can be designed to send a vehicle activation signal to the electronic control unit, which controls an accessibility to the vehicle. In other words, the user upon identifying the vehicle by viewing the identification code on the display panel, can send an identification signal to the control circuitry by use of his smart phone, based on the booking code. Upon receiving the identification signal, the control circuitry can send a vehicle activation signal to the electronic control unit. The electronic control unit upon receiving the vehicle activation signal can allow an accessibility of the vehicle to the user. The electronic control unit can enable an unlocking of the vehicle door locking unit, such that the user can enter the vehicle and the electronic control unit can enable the user to have access to other devices in the vehicle and as a result of which the user can use the vehicle to travel as per his needs. This is of advantage, because this enables an efficient functioning of the vehicle as a car sharing vehicle. Furthermore, it is thinkable that the user can provide a digital payment by use of his smart phone to the car sharing company which in turn can transfer a part of the payment to the owner of the vehicle.

In an embodiment, the display panel can be rotatably attached to the support arrangement, wherein the display panel is rotatable about an axis parallel to a main edge of the display panel between the first position and the second position. This is of advantage, because this enables the support arrangement to be constructed in a simplified and an economical manner. Furthermore, the supporting arrangement can form a robust structure, so that the display panel can be easily rotated from the first position to the second position. For example, the user, upon parking the car, can rotate the display panel from the first position to the second position, thus that the display panel can be visually accessible for the user or the plurality of people outside the vehicle.

Also described herein is a method for operating a display device including a display panel for displaying information represented by at least one graphic display object, such that the display panel can be adjusted between a first position and a second position. The method enables the displaying of the at least one graphic display object by use of a control circuitry of the display device, such that the information represented by the at least one graphic display object is displayed in accordance with a predefined physical environment condition.

Also described herein are various combinations of the features of the described embodiments, if not stated otherwise.

BRIEF DESCRIPTION OF THE DRAWINGS

In the following aspects and advantages will become more apparent and more readily appreciated from the following description of various examples, taken in conjunction with the accompanying drawings, of which.

DETAILED DESCRIPTION

Figure 1:
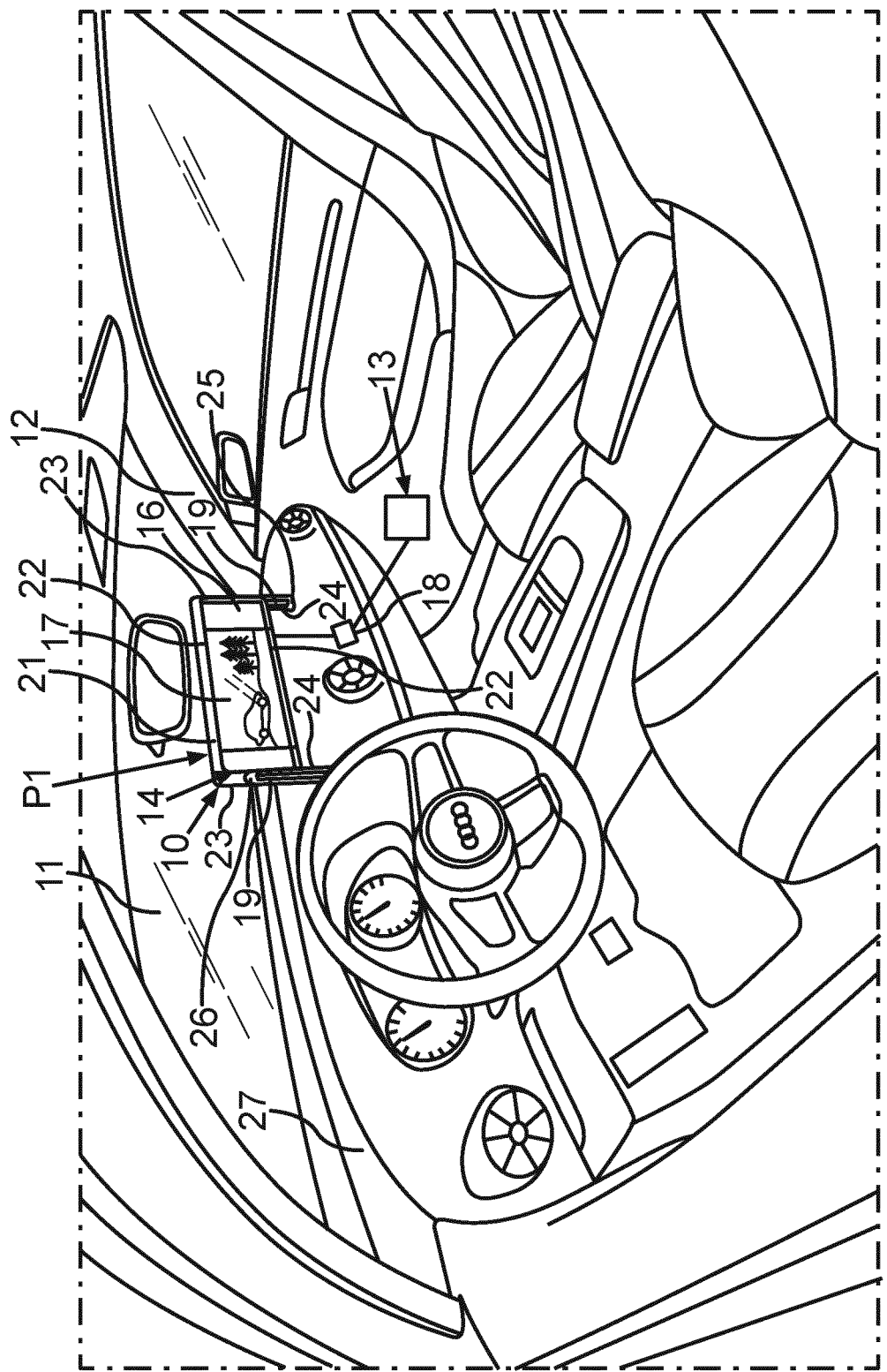
FIG. 1 is a schematic illustration of an embodiment of a display device with a display panel in a first position in a vehicle, according to an example of the disclosure.

The embodiments explained herein are example embodiments. However, in the embodiments, the described components of the embodiments each represent individual features which are to be considered independently of each other and which each develop the disclosure also independently of each other and thereby are also to be regarded as a component in an individual manner or in another manner than the shown combination. Furthermore, the described embodiments can also be supplemented by further features already described.

In the drawings identical reference signs indicate elements that provide the same function.

FIG. 1 shows a schematic illustration of an embodiment of a display device 10, wherein an interior view of an interior region 11 of a vehicle 12 is depicted. The vehicle 12 may be a motor vehicle, such as a passenger vehicle. The vehicle 12 may include a driver assistant system (not shown in the drawings), which can provide, for example, an autopilot functionality. In other words, the driver assistant system may drive the vehicle 12 autonomously or fully automatically. The vehicle 12 can further include an electronic control unit 13 which can be designed to operate other devices inside the vehicle 12.

Figure 2:
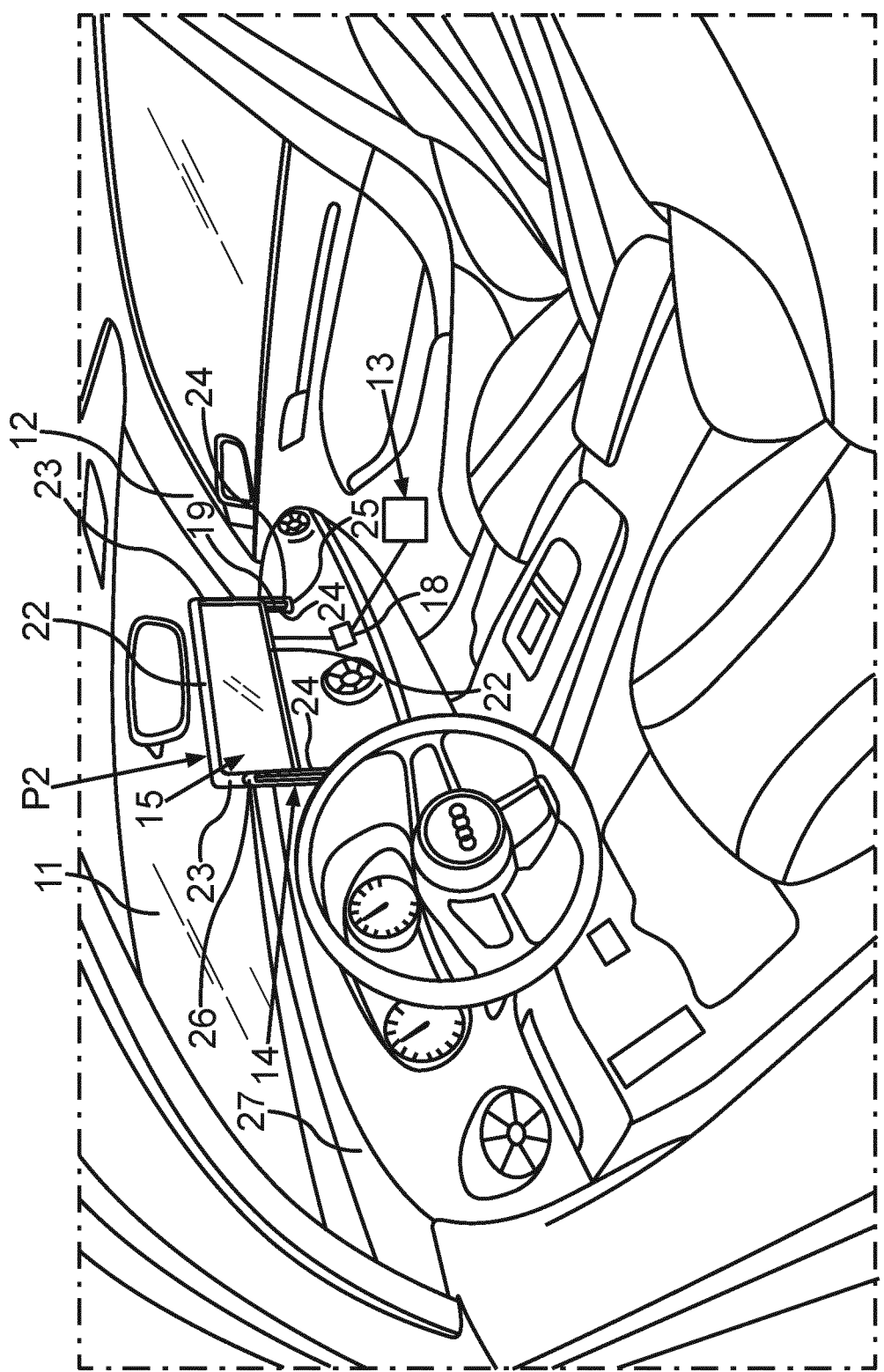
FIG. 2 is a schematic illustration of an embodiment of the display device with a display panel in a second position in the vehicle, according to an example of the disclosure.
Figure 3:
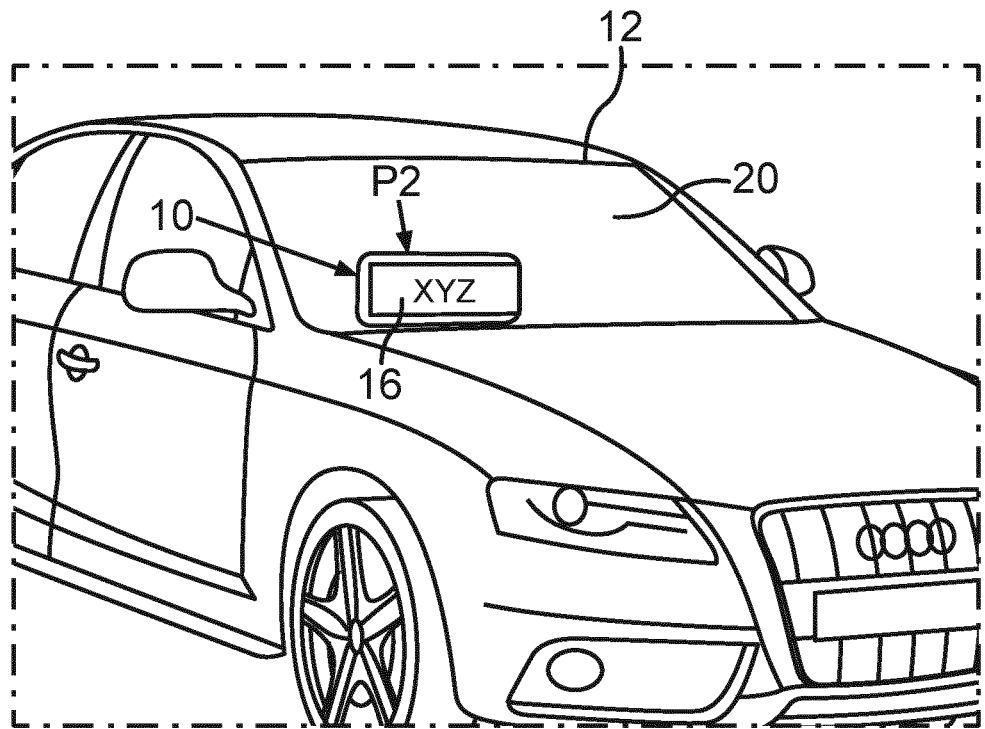
FIG. 3 is a schematic illustration of the display device with a display panel in the second position from outside the vehicle, according to an example of the disclosure.

The display device 10 with a first side 14 and a second side 15, as shown in FIG. 2, includes a display panel 16 which is designed to display at least one graphic display object 17. The display panel 16 can be a liquid crystal display panel (LCD). The display device 10 may further include a control circuitry 18 which can be designed to enable the displaying of the at least one graphic display object 17. Furthermore, the display device 10 can include a supporting arrangement 19 which can be designed to support the display panel 16. The display panel 16 can be adjustable between a first position P1 and a second position P2, wherein in the first position P1, the at least one graphic display object 17 on the display panel 16 is visually accessible to a user (not shown in the drawings) inside the vehicle 12 and in the second position P2, the at least one graphic display object 17 on the display panel 16 can be visually accessible to the user and/or at least one of a plurality of persons (not shown in the drawings) outside the vehicle, as shown in FIG. 3. As shown in FIG. 3, the graphic display object 17 can be visible from outside the vehicle 12, for example, through a windscreen 20 of the vehicle 12. The display device 10 can include a casing 21 which can surround and protect the display panel 16. Furthermore, the casing 21 can form the second side 15 of the display device 10, as shown in FIG. 2. The display device 10 can be rotatably attached to the support arrangement 19, wherein the display panel 16 can be rotatable about an axis parallel to a main edge 22 of the display panel 16 between the first position P1 and the second position P2.

The supporting arrangement 19 may include two supporting structures 24, such that each of the supporting structures 24 can be connected or attached to the casing 21 on each of an auxiliary side 23 of the display panel 16. Each of the supporting structures 24 may include a first end 25 and a second end 26, such that at the first end 25, each of the supporting structures 24 is integrated to a dashboard 27 of the vehicle 12. The second end 26 of each of the supporting structures 24 can be attached to the casing 21 on each of an auxiliary side 23, such that the second end 26 of each of the supporting structures 24 can be connected rotatably to the casing 21 on each of the auxiliary sides 23. For example, the user can be seated inside the vehicle and can view information represented by the at least one graphic display object 17 on the display panel in the first position P1. When the user parks the vehicle 12 and decides to move out of the vehicle 12, in that case the user can rotate the display device 10 about the second end 26 of the supporting structure 24, such that the display device 10 is adjusted to the second position P2. In this case, information represented by the graphic display object 17 on the display panel can be visually accessible to the user and/or the at least one of the plurality of persons from outside the vehicle 12.

The control circuitry 18 can be adapted to enable the displaying of the at least one graphic display object 17, such that information represented by the at least one graphic display object 17 can be displayed in accordance with a predefined physical environment condition. When the display panel 16 is in the first position P1, information represented by the at least one graphic display object 17 may be a navigation route and/or information about the weather and/or selection of a playlist of songs from a music system and/or selection of a radio station and/or a setting of an audio volume and/or setting of an air condition system, such that the user or a plurality of persons seated inside the vehicle, can access the necessary information represented by the graphic display object 17 on the display panel 16, in order to have a safe and comfortable drive.

When the display panel 16 is in the second position P2, the predefined physical environment condition can be based on an identification of a presence of the user or at least one person among a plurality of persons in a predefined threshold distance from the display device 10 outside the vehicle 12, as signaled by a proximity sensor (not shown in the drawings). Furthermore, when the display panel 16 is in the second position P2, information represented by the at least one graphic display object 17 may be a predefined text message including a personal message referring to a predefined user, as may be signaled by a face recognition sensor (not shown in the drawings) and/or a receiver for receiving an identification signal from a mobile device.

The control circuitry 18 may be adapted to disable the displaying of a personal message, such as, "XYZ", as shown in FIG. 3, by the display panel 16, after an expiration of a predefined time interval and/or upon receiving a communication signal from the predefined user, that the personal message is no longer needed to be displayed and/or upon identification that the predefined user is no longer proximate to the display device 10.

Figure 4:
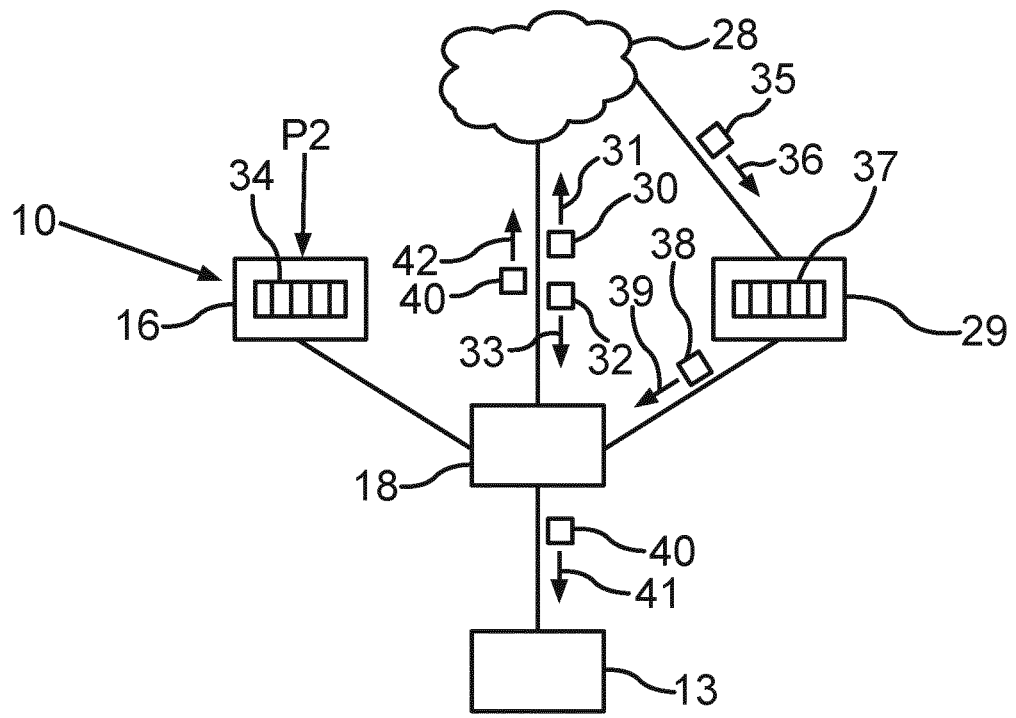
FIG. 4 is a block diagram of an embodiment of the display device, according to an example of the disclosure.

Furthermore, when the display panel 16 is in the second position P2, information represented by the at least one graphic display object 17 may be a predefined parking time, for which the control circuitry 18 has triggered a digital payment. Furthermore, when the display panel 16 is in the second position P2, information represented by the at least one graphic display object 17 can be an informational message and/or an advertisement on the basis of the predefined physical environment condition, wherein the physical environment condition is based on an identification of a current location of the vehicle 12 and/or a physical environment of the vehicle 12 and/or a weather report, as signaled by a backend server unit 28, as shown in FIG. 4.

The vehicle 12 can be used as a car sharing vehicle, such that after parking the vehicle 12 at a parking location, the user can log in to a website of a car sharing company by use of the display panel 16. Furthermore, upon parking the user may then turn the display panel 16 to the second position P2, upon which the control circuitry 18 can send a registration signal 30 to the backend server unit 28, for example of a car sharing company, as shown by an arrow 31. Upon receiving the registration signal 30, the backend server unit 28 can send an identification signal 32 to the control circuitry 18, as shown by an arrow 33. After receiving the identification signal 32, information of the at least one graphic display object 17 includes an identification code 34, which indicates the booking of the vehicle 12 in a booking system, for example of the car sharing company.

Another user can log in to the car sharing company website by use of a computing device, for example a smart phone 29, in order to book a vehicle that may be available. Upon logging in the user or the smart phone 29 of the user, the smartphone 29 may receive a booking signal 35 from the backend server unit 28, as shown by an arrow 36. After receiving the booking signal 34, the smart phone 29 of the user may display a booking code 37. The booking code 37 may include information about coordinates of the parking location of the vehicle 12 and the identification code 34, that would be displayed on the display panel 16 of the vehicle 12. The user can travel to the parking location of the vehicle 12, upon reaching the parking location, the user can identify the vehicle 12 by viewing the identification code 34 on the display panel 16.

The user can then send an identification signal 38 to the control circuitry 18 by use of his smart phone 29, based on the booking code 37. The identification signal 38 can be received by the control circuitry 18, as is shown by an arrow 39. The identification signal 38 can be received by the control circuitry 18 from the smart phone 29 of the user by use of a wireless connection. Upon receiving the identification signal 38, the control circuitry 18 can send a vehicle activation signal 40 to the electronic control unit 13, as shown by an arrow 41. The electronic control unit 13 upon receiving the vehicle activation signal 40 can allow an accessibility of the vehicle 12 to the user. Furthermore, the control circuitry 18 can send the vehicle activation signal 40 to the backend server unit 28, as shown by an arrow 42, so that a user, who is the owner of the vehicle 12, can receive information that the vehicle 12 is being used by another user by use of a signal or a message that can be received by his smartphone. The signal or message can be sent by the backend server unit 28, upon receiving the vehicle activation signal 40 from the control circuitry 18 of the display device 10.

A description has been provided with reference to various examples, but it will be understood that variations and modifications can be effected within the spirit and scope of the claims which may include the phrase "at least one of A, B, and C" as an alternative expression that means one or more of A, B, and C may be used, contrary to the holding in Superguide v. DIRECTV, 358 F3d 870, 69 USPQ2d 1865 (Fed. Cir. 2004). As an example, the scope of the expression "at least one of A, B, and C" is intended to include: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

The invention claimed is:

1. A display device for a vehicle, comprising:
   a display panel configured to display a graphic display object;
   a control circuitry configured to enable a display of the graphic display object such that information represented by the graphic display object is displayed based on a predefined physical environment conditions; and
   a support arrangement configured to rotatably support each side of two auxiliary sides of the display panel such that the display panel is turn-able about an axis parallel to a main edge of the display panel to be adjustable between a first position and a second position,
   wherein
   in response to a first turning adjustment of the display panel to the first position, sending a signal to display, by the display panel, a first graphic display object corresponding to the first position and a first predefined physical environment condition among the predefined physical environment conditions which is visually accessible to a user among users located inside the vehicle, and
   in response to a second turning adjustment of the display panel to the second position, sending a signal to display, by the display panel, a second graphic display object corresponding to the second position and a second predefined physical environment condition among the predefined physical environment conditions which is visually accessible to at least one user among the users located outside the vehicle and/or another person located outside the vehicle.

2. The display device according to claim 1, wherein when the display panel is in the second position, the second predefined physical environment condition is based on an identification of a presence of the at least one user within a predefined threshold distance from the display device outside the vehicle, as signaled by a proximity sensor.

3. The display device according to claim 1, wherein when the display panel is in the second position, the information represented by the graphic display object includes a predefined text message including a personal message referring to a predefined user among the users, as signaled by at least one of a face recognition sensor and a receiver configured to receive an identification signal from a mobile device.

4. The display device according to claim 3, wherein the control circuitry is configured to disable a display of the personal message by the display panel, in response to at least one of an expiration of a predefined time interval, receiving a communication signal from the predefined user that the personal message is no longer needed to be displayed, and identifying that the predefined user is no longer proximate to the display device.

5. The display device according to claim 1, wherein when the display panel is in the second position, the information represented by the graphic display object includes a predefined parking time, corresponding to digital payment for parking the vehicle triggered by the control circuitry.

6. The display device according to claim 5, wherein the control circuitry is configured to trigger the digital payment for parking the vehicle, in response to the vehicle being parked.

7. The display device according to claim 1, wherein
when the display panel is in the second position, the information represented by the graphic display object includes at least one of an informational message and an advertisement based on the second predefined physical environment condition, and
the second predefined physical environment condition is based on at least one of an identification of a current location of the vehicle, a physical environment of the vehicle, and weather, as signaled by a backend server remotely located from the vehicle.

8. The display device according to claim 1, wherein when the display panel is in the second position, the information represented by the graphic display object includes an identification code which indicates a booking of the vehicle in a booking system.

9. The display device according to claim 8, wherein
the control circuitry is configured to receive an identification signal based on a booking code corresponding to the identification code, and
in response to receiving the identification signal, the control circuitry is configured to send a vehicle activation signal to an electronic control unit of the vehicle which controls accessibility to the vehicle.

10. A method of operating a display device of a vehicle, comprising:
displaying, by a display panel of the display device, a graphic display object;
controlling, by a control circuitry of the display device, the displaying of the graphic display object such that information represented by the graphic display object is displayed based on predefined physical environment conditions; and
rotatably supporting each side of two auxiliary sides of the display panel such that the display panel is turn-able about an axis parallel to a main edge of the display panel to be adjustable between a first position and a second position,
wherein
in response to a first turning adjustment of the display panel to the first position, sending a signal to display, by the display panel, so that a first graphic display object corresponding to the first position and a first predefined physical environment condition among the predefined physical environment conditions is displayed by the display panel which is visually accessible to a user among users located inside the vehicle, and
in response to a second turning adjustment of the display panel to the second position, sending a signal to display, by the display panel, so that a second graphic display object corresponding to the second position and a second predefined physical environment condition among the predefined physical environment conditions is displayed by the display panel which is visually accessible to at least one user among the users located outside the vehicle and/or another person located outside the vehicle.

11. The method according to claim 10, wherein when the display panel is in the second position, the second predefined physical environment condition is based on an identification of a presence of the at least one user within a predefined threshold distance from the display device outside the vehicle, as signaled by a proximity sensor.

12. The method according to claim 10, further comprising:
when the display panel is in the second position, displaying a personal message referring to a predefined user among the users as the information represented by the graphic display object, in response to receiving a signal identifying the predefined user; and
when the display panel is in the second position, disabling displaying of the personal message, in response to at least one of an expiration of a predefined time interval, receiving a communication signal from the predefined user that the personal message is no longer needed to be displayed, and identifying that the predefined user is no longer proximate to the display device.

13. The method according to claim 10, further comprising:
automatically triggering a digital payment for parking the vehicle, in response to the vehicle being parked, and
automatically controlling the display panel to be adjusted to the second position after the vehicle is parked and displaying a predefined parking time as the information represented by the graphic display object, wherein the predefined parking time corresponds to the digital payment for parking the vehicle.

14. The method according to claim 10, further comprising:
receiving, from a backend server remotely located from the vehicle, at least one of an identification of a current location of the vehicle, a physical environment of the vehicle, and weather; and
when the display panel is in the second position, displaying at least one of an informational message and an advertisement based on the second predefined physical environment condition, as the information represented by the graphic display object,
wherein
the second predefined physical environment condition is based on at least one of the identification of the current location of the vehicle, the physical environment of the vehicle, and the weather, received from the backend server.

15. The method according to claim 10, further comprising:
when the display panel is in the second position, displaying an identification code which indicates a booking of the vehicle in a booking system, as the information represented by the graphic display object;
receiving an identification signal based on a booking code corresponding to the identification code; and
in response to receiving the identification signal, transmitting a vehicle activation signal to an electronic control unit of the vehicle to control accessibility to the vehicle.

16. A vehicle, comprising:
an interior region; and
a display device disposed in the interior region, the display device including:
a display panel configured to display a graphic display object,
a control circuitry configured to enable a display of the graphic display object such that information represented by the graphic display object is displayed based on predefined physical environment conditions, and
a support arrangement configured to rotatably support each side of two auxiliary sides of the display panel such that the display panel is turn-able about an axis parallel to a main edge of the display panel to be adjustable between a first position and a second position, wherein in response to a first turning adjustment of the display panel to the first position, sending a signal to display, by the display panel, a first graphic display object corresponding to the first position and a first predefined physical environment condition among the predefined physical environment conditions which is visually accessible to a user among users located inside the vehicle, and in response to a second turning adjustment of the display panel to the second position, sending a signal to display, by the display panel, a second graphic display object corresponding to the second position and a second predefined physical environment condition among the predefined physical environment conditions which is visually accessible to at least one user among the users located outside the vehicle and/or another person located outside the vehicle.

17. The vehicle according to claim 16, wherein when the display panel is in the second position, the second predefined physical environment condition is based on an identification of a presence of the at least one user within a predefined threshold distance from the display device outside the vehicle, as signaled by a proximity sensor.

18. The vehicle according to claim 16, wherein when the display panel is in the second position, the information represented by the graphic display object includes a predefined text message including a personal message referring to a predefined user among the users, as signaled by at least one of a face recognition sensor and a receiver configured to receive an identification signal from a mobile device, and the control circuitry is configured to disable displaying of the personal message by the display panel, in response to at least one of an expiring predefined time interval, receiving a communication signal from the predefined user that the personal message is no longer needed to be displayed, and identifying that the predefined user is no longer proximate to the display device.

19. The vehicle according to claim 16, further comprising:

an electronic control unit configured to control accessibility to the vehicle, wherein when the display panel is in the second position, the information represented by the graphic display object includes an identification code which indicates a booking of the vehicle in a booking system, the control circuitry is configured to receive an identification signal based on a booking code corresponding to the identification code, in response to receiving the identification signal, the control circuitry is configured to send a vehicle activation signal to the electronic control unit, and the electronic control unit is configured to permit access to the vehicle based on the vehicle activation signal.

* * * * *